(12) United States Patent
Wee

(10) Patent No.: US 9,262,373 B2
(45) Date of Patent: *Feb. 16, 2016

(54) CLOUD-BASED SOFTWARE ECO-SYSTEM

(71) Applicant: Accenture Global Services Limited, Dublin 4 (IE)

(72) Inventor: Sewook Wee, San Jose, CA (US)

(73) Assignee: Accenture Global Services Limited, Dublin (IE)

( * ) Notice: Subject to any disclaimer, the term of this patent is extended or adjusted under 35 U.S.C. 154(b) by 222 days.

This patent is subject to a terminal disclaimer.

(21) Appl. No.: 13/924,172

(22) Filed: Jun. 21, 2013

(65) Prior Publication Data

US 2013/0282880 A1    Oct. 24, 2013

Related U.S. Application Data

(62) Division of application No. 13/050,748, filed on Mar. 17, 2011, now Pat. No. 8,566,428.

(60) Provisional application No. 61/316,976, filed on Mar. 24, 2010.

(51) Int. Cl.
```
G06F 15/173    (2006.01)
G06F 15/177    (2006.01)
G06F 9/445     (2006.01)
G06F 9/45      (2006.01)
```
(52) U.S. Cl.
CPC .......... *G06F 15/177* (2013.01); *G06F 9/44505* (2013.01)

(58) Field of Classification Search
CPC .............. G06F 9/5077; G06F 9/44505; G06F 9/45533; G06F 11/3428; G06F 11/3404
See application file for complete search history.

(56) References Cited

U.S. PATENT DOCUMENTS

| | | | |
|---|---|---|---|
| 7,954,095 B2 * | 5/2011 | Archer | G06F 11/3495 709/201 |
| 7,996,814 B1 | 8/2011 | Qureshi et al. | |
| 8,069,242 B2 * | 11/2011 | Hadar | G06F 9/5072 709/223 |
| 8,095,486 B2 | 1/2012 | Chen et al. | |
| 8,117,146 B2 | 2/2012 | Sankar et al. | |
| 8,869,126 B2 * | 10/2014 | Guenthner | G06F 8/456 717/146 |
| 2006/0015589 A1 | 1/2006 | Ang et al. | |
| 2007/0234327 A1 | 10/2007 | Baxter et al. | |
| 2011/0131306 A1 * | 6/2011 | Ferris et al. | 709/223 |

* cited by examiner

*Primary Examiner* — Wen-Tai Lin
(74) *Attorney, Agent, or Firm* — Fish & Richardson P.C.

(57) ABSTRACT

A novel eco-system is provided which first supplies a standardized template of one or more virtual machine images for software module providers/vendors. A plurality of modules executing on the virtual machine images is selected by a user to comprise a plurality of configurations. A suitable configuration may be determined according to a metric and the determined suitable configuration of software modules is subsequently used to build an end-to-end solution.

24 Claims, 5 Drawing Sheets

Exemplary Computer System 500

CLOUD-BASED SOFTWARE ECO-SYSTEM

CLAIM OF PRIORITY

This application is a divisional of U.S. Utility patent application Ser. No. 13/050,748, filed Mar. 17, 2011, which claims priority to the provisional application entitled, "Cloud-Based Software Eco-System," filed Mar. 24, 2010, Application No. 61/316,976. Each of these references are incorporated by reference herein in their entireties and for all purposes.

BACKGROUND

Large scale applications are often designed in a modular fashion. Commonly, these modules will have well-defined or even standardized input/output formats and objectives. These well-defined input/output format and objectives allow collaborative effort amongst multiple, independent researchers and engineers to contribute to the development community by solving or attempting to address modularized problems and propose various optimization techniques or heuristics (e.g., as "software modules") to effectively and efficiently solve the problems. As a result, well-established domains may be saturated with several software approaches or hardware tools from various vendors to solve any single problem.

For example, a typical computer-aided design (CAD) application for very large scale integrated circuits (VLSI) may have several "steps" implemented as cooperative but logically separate software modules: 1) a hardware description language (HDL) translation module that generates a netlist with primitive logic gates and their connection network, 2) a place module that maps logic gates to corresponding suitable locations on a semiconductor and 3) a routing module that places wires that connects the logic gates. Because the input and output format of typical CAD applications are well defined, the particular CAD domain has become reasonably saturated, and several integrated applications are commercially available which ostensibly perform the same tasks, at varying efficiencies. Selecting an appropriate, high-performing application or even a compatible configuration of modules from multiple applications to perform a particular CAD design can become a difficult proposition. Likewise, selecting well-performing applications or configurations to perform other tasks can be similarly complicated.

Specifically, it may not always be immediately discernible which tool or approach will be the solution with a desirable level of performance for solving a particular problem or performing a specific task. Often, several solutions will each have fervent support among its developers and users. Conventionally, a high-performing solution for a particular task or problem may be accurately achieved by applying a wide selection of tools to solve a particular problem or to perform a particular task, comparing the results, and selecting the tool which achieved the best results. Unfortunately, purchasing operating licenses for every available tool can be extremely cost-intensive.

Although the cost of some tools may be partially mitigated by the availability of evaluation licenses, in many cases the evaluation versions will have severe restrictions on usage and/or limited features. Furthermore, effectively testing and comparing solution candidates typically requires a large scale infrastructure that can execute multiple tools in parallel. Moreover, because the algorithms these tools implement are usually computing and memory intensive, the execution of multiple tools may be prohibitively time intensive. Furthermore, amassing the specific hardware and software resources for sufficiently large infrastructures of information technology is notoriously expensive, and configuring the resources to perform cooperatively can be enormously complex. Finally, even when the interface is well defined, and the infrastructure is in place, integrating multiple third party tools into a single, seamless workflow is non trivial and typically requires operators with significant tool-specific knowledge, and, even then can be extremely time consuming and error-prone to use.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

As a solution to the problems noted above, this disclosure provides a novel eco-system that executes multiple software modules in parallel; compares their results, performance scores, and costs; and produces a selected and/or combined result. This eco-system may be hosted on an infrastructure cloud, which offers virtualized infrastructure resources such as computing servers and storage capacity. Users dynamically provision the resources as much as they need and only pay by their usage.

In one embodiment, an eco-system may be generated for a user by incorporating a plurality of selected software modules to provide a solution. Then, during an application's run time, the eco-system dynamically provisions the hardware resources to execute the selected modules in parallel. A user may then choose one or more comparison metrics to compare multiple modules at the same step or stage of an application sequence or flow.

In some instances, it may be preferable to assign additional credibility (e.g., weight) to the modules which have established performance histories. However, requiring users to assign a quantitative weight for each individual module may be confusing and undesirable. To address this problem, an automated credibility scoring tool is also provided.

DETAILED DESCRIPTION

Figure 1:
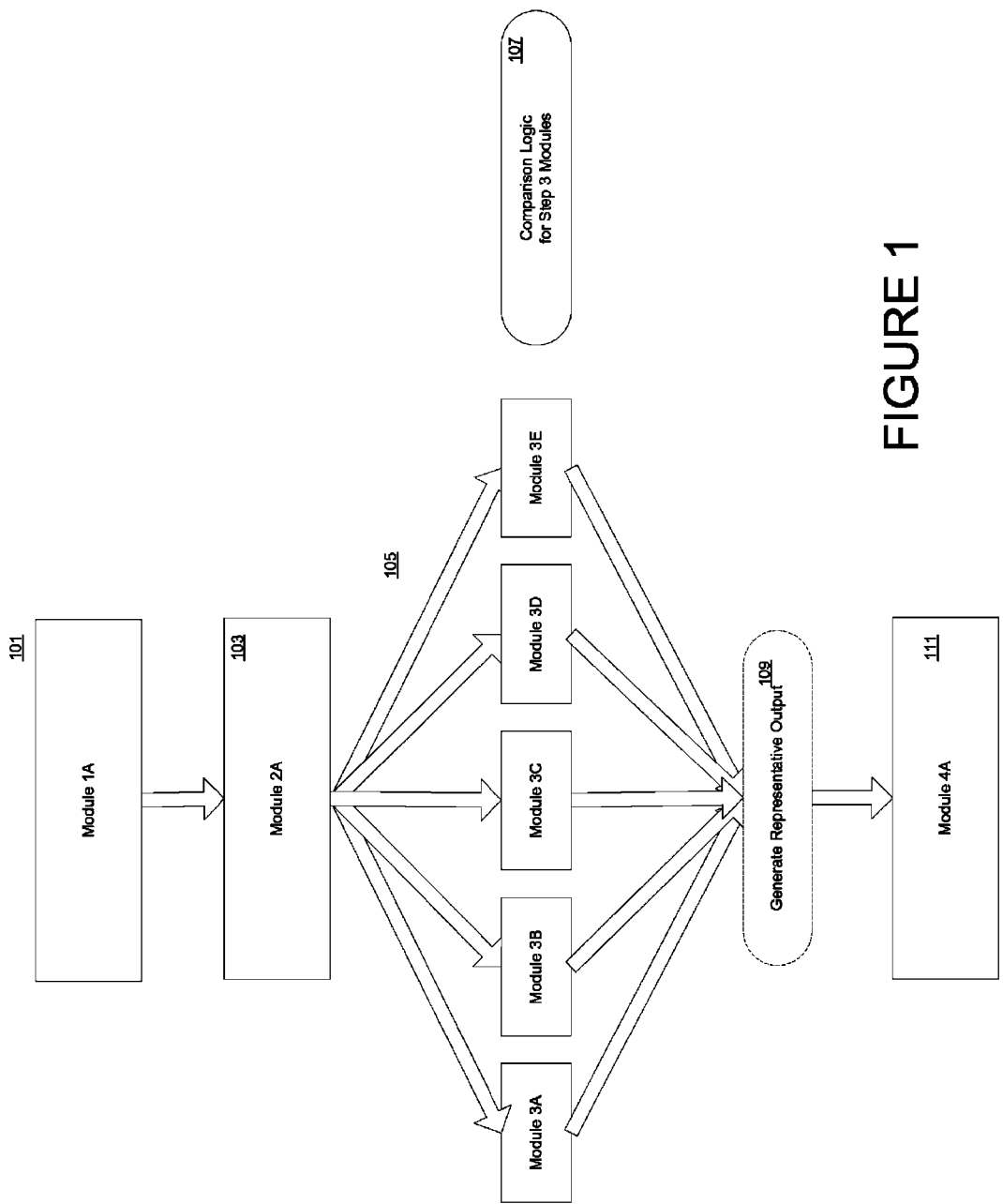
FIG. 1 is an illustration of an exemplary method for generating disparate configurations of software modules to be performed in parallel, in accordance with various embodiments of the claimed subject matter.

Reference will now be made in detail to the preferred embodiments of the claimed subject matter, a method and system for the use of a reputation service provider, examples of which are illustrated in the accompanying drawings. While the claimed subject matter will be described in conjunction with the preferred embodiments, it will be understood that they are not intended to be limit to these embodiments. On the contrary, the claimed subject matter is intended to cover alternatives, modifications and equivalents, which may be included within the spirit and scope as defined by the appended claims.

Furthermore, in the following detailed descriptions of embodiments of the claimed subject matter, numerous specific details are set forth in order to provide a thorough understanding of the claimed subject matter. However, it will be recognized by one of ordinary skill in the art that the claimed subject matter may be practiced without these specific details. In other instances, well known methods, procedures, components, and circuits have not been described in detail as not to unnecessarily obscure aspects of the claimed subject matter.

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer generated step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present claimed subject matter, discussions utilizing terms such as "storing," "creating," "protecting," "receiving," "encrypting," "decrypting," "destroying," or the like, refer to the action and processes of a computer system or integrated circuit, or similar electronic computing device, including an embedded system, that manipulates and transforms data represented as physical (electronic) quantities within the computer system's registers and memories into other data similarly represented as physical quantities within the computer system memories or registers or other such information storage, transmission or display devices.

Embodiments of the claimed subject matter provide novel methods and eco-systems that execute multiple software modules in parallel; compare their results, performance scores, and costs; and produce a selected and/or combined result. According to various embodiments, these eco-systems may be hosted within a cloud computing infrastructure, which provides computation, capacity, and storage on demand. Typically, within a cloud computing infrastructure, several virtual machines (VMs) are hosted from each (of potentially many) physical hardware infrastructure resources (e.g., servers). Individual consumers of cloud computing services may lease the processing and storage services of one or more of these virtual machines, distributed among one or more physical infrastructure resources in a cloud data center. Typical cloud computing service agreements are based on a self-service usage model which allows a virtually unlimited amount of computing resources to be dynamically requisitioned, on demand, from a pool of shared computing resources offered by a cloud computing vendor. Thus, instead of grossly over-provisioning (or under-provisioning) initial static computing resources due to uncertain demands, cloud computing consumers can elastically provision infrastructure resources from the provider's pool only when needed. In addition, the pay-per-use model allows subscribers to pay for the actual consumption instead of for estimated peak capacity.

In one embodiment, an eco-system may be generated for a user by incorporating a plurality of selected software modules to provide a solution. Thus, for example, for each step of an application flow, a user may select the specific modules from a plurality of software vendors to execute in parallel and the particular comparison/aggregation metrics to apply during execution. Then, during an application's run time, the eco-system dynamically provisions the hardware resources to execute the selected modules in parallel, distributes the input information to multiple hardware resources, collects the output and comparison metrics data from them, and selects or aggregates the output so that it can be consumed as the input of the next step.

FIG. 1 depicts an application flow of a process for generating disparate configurations of software modules to be performed in parallel. As depicted, a user may select one or more disparate modules for each "step" in an application process or flow. Steps 101-111 describe the steps comprising the process depicted in the flowchart of FIG. 1 in accordance with the various embodiments herein described. In one embodiment, the flowchart 100 is implemented as computer-executable instructions stored in a non-transitory computer-readable medium.

As shown in FIG. 1, to perform some steps of an example application process, a single software module may be selected (e.g., modules 1A, 2A, and 4A, corresponding to steps 101, 103, and 111, respectively). A single software module may be selected when, for example, a user has confidence or a preference in a particular module and has no desire or need to compare the performance of other software modules. Alternatively, a single software module may be opted for when there are no other software modules suitable to perform a step, and/or available options are restricted.

For some steps (e.g., step 105 of FIG. 1) of an application process however, a user may choose to select a plurality of modules to perform a comparison of the respective performances for that particular step (e.g., modules 3A, 3B, 3C, 3D and 3E). The user may select a plurality of modules to determine a suitable (e.g., compatible) configuration of modules for an application flow, for example. According to embodiments of the present disclosure, the eco-system may be used to requisition multiple computing servers to perform the individual iterations of the application flow according to FIG. 1. The servers may be virtualized from images that are individually configured with each module. In one embodiment, a single requisitioned cloud computing resource (e.g., virtualized server) may be configured with all of the modules for each step of the application flow except for the steps where module-comparison is performed. To perform steps involving module comparison (such as step 105 of FIG. 1), the modules may be apportioned separately to dedicated, requisitioned, cloud computing resources (e.g., virtualized computing systems) and executed in parallel. Alternatively, each software module of an application process—including the steps including single software modules and for whom comparisons will not be performed—may also be executed on a dedicated, requisitioned, cloud computing resource.

At step 107, a user may then choose one or more comparison metrics to compare multiple modules at the same step or stage of an application sequence or flow (e.g., Modules 3A-3E). For example, if the user selects a comparison metric to determine the module with the least maximum latency, the eco-system will compare the maximum latency attributable to each module, and chooses the optimal module (e.g., module 3D). This result may be fed into the final module (e.g., Module 4A) as an input, for example. In some instances, because an eco-system of an application flow, as provided, may be configured to provide multiple equivalent software modules to run in parallel, the eco-system may also be capable of generating multiple outputs. According to some embodiments however, each software module at any step may assume only one input as it may be unaware of the number of parallel modules in a previous step. Therefore the eco-system may, optionally, apply logic to produce one representative output (e.g., at step 109). This feature may be applied even when a parallel-executed step is the final step.

According to some embodiments, multiple approaches may be used to produce the representative output at step 109. Sample methods may include, but are not limited to, a selection method, a voting method, and an average method. In some instances, the appropriate method may depend on the specific application(s). In one embodiment, the selection method chooses one out of multiple outputs based on one or more weighted key criteria selected by the user. The eco-system will automatically score each output per criteria, total the outputs based on user-defined weight factor, and choose one output that received the best or highest "score."

The voting method chooses the output that the majority of modules share (e.g., have in common). Thus, for example, cognitive applications—e.g., voice or video recognition—which produce categorical output may be appropriate with the voting method. For example, if the system needs to recognize whether the audio stream says "yes" or "no," the eco-system may run several modules in parallel, and if a majority (e.g., 4 out of 5) of the modules recognize that the audio stream indicated "yes," then, the eco-system chooses "yes" as a representative output. Depending on the credibility (see below), maturity, and specialties of each module, the eco-system may also conduct weighted voting to generate a representative output.

The average method produces one representative output by averaging multiple outputs. An example where the average method of producing representative output is for applications involving pricing engines. Typically, pricing engines are used to predict the future value of goods. There are many methods for prediction, such as methods based on analytical models, historical data, stochastic simulation, or market analysis. With the eco-system according to embodiments of the present disclosure, each method can be developed separately as a module and may produce different output. Subsequently, the eco-system may average the output of the modules and produce a representative price. Also, depending on the credibility, maturity, and specialties of each method, the eco-system may produce the weighted average of the outputs as a representative output.

In some instances, it may be preferable to assign additional credibility (e.g., weight) to the modules which have established performance histories. However, requiring users to assign a quantitative weight for each individual module may be confusing and undesirable. To address this problem, an automated credibility scoring tool is also provided according to various embodiments.

In one embodiment, an automated credibility scoring tool may be implemented as a module performance analytics tool. In some embodiments, the module performance analytics tool may monitor, for example, 1) the "winning" frequency for selection or voting based modules (i.e., the frequency a module generates an output that is selected as, or consistent with, the output ultimately used as the representative output during past performances including the module), 2) the error distance for average based module (i.e., the disparity between output generated by a module and the averaged output during past performances including the module), 3) the accuracy with regard to the future actual value for prediction modules, and 4) the cost of running the module, including infrastructure cost and software license. Naturally, a module may receive more credibility and may be awarded a higher weight when its output is selected more frequently, is consistent with the majority voting party more frequently, consistently achieves comparatively lower error distance to average and/or the actual future value, or is executed with comparatively lower cost. A module's history may be collected from a user's own experience as well as the reports from the user community.

Figure 2:
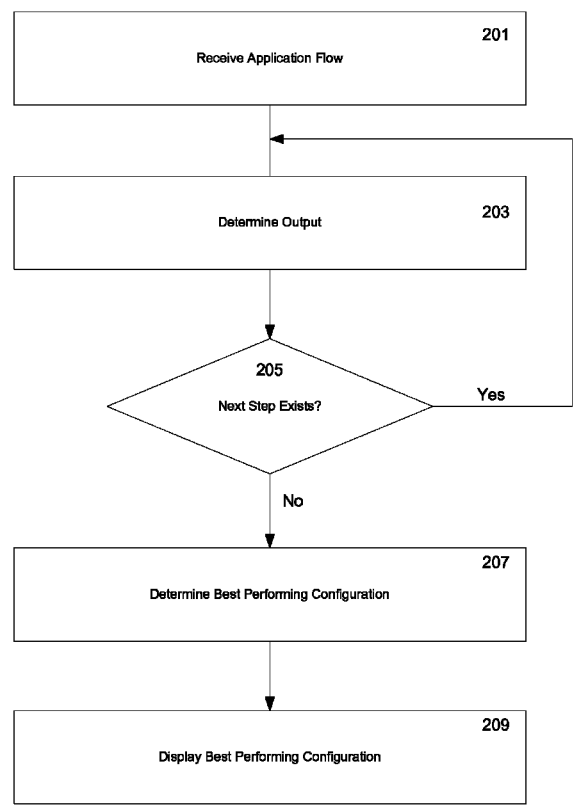
FIG. 2 is an illustration of an exemplary method for executing configurations of disparate software modules to determine a suitable solution, in accordance with various embodiments of the claimed subject matter.

In one embodiment, a suitable configuration of software modules may be generated for a user by a software eco-system by incorporating a plurality of user-selected candidate software modules into separate application flows, executing each flow in parallel and determining the best performing configuration. FIG. 2 depicts a flowchart 200 of a method for executing configurations of disparate software modules to determine a suitable solution. Steps 201-209 describe the steps comprising the process depicted in the flowchart of FIG. 2 in accordance with the various embodiments herein described. In one embodiment, the flowchart 200 is implemented as computer-executable instructions stored in a non-transitory computer-readable medium.

At step 201, an application flow is received in a software eco-system. The application flow may be submitted by a user of the software eco-system, for example, and may include a plurality of steps, or desired outputs. Alternatively, the application flow may be automatically generated by the software eco-system based on user-submitted inputs and/or outputs, or a user-selected task to be performed. Once the application flow is received at step 201, a plurality of software modules may be selected to perform each step of the application flow, or as candidate software modules to perform each step. The software modules may be selected from an inventory in the software eco-system, for example, and displayed in a graphical user interface. In one embodiment, the user may select the individual software modules to perform the steps in the application flow. Alternatively, the eco-system may include logic configured to automatically populate the steps with software modules depending on the received application flow and/or the supplied input/outputs. In some embodiments, each step in an application flow may be performed by one or more candidate software modules. According to these embodiments, a comparison of the performance of the candidate software modules may be achieved by executing each candidate software module in parallel on a separate computing environment while using the same input (e.g., the output of the immediately preceding step). The candidate software modules may be executed on dynamically requisitioned computing resources from a cloud computing infrastructure, for example.

At step 203, the output of each step is determined by executing the software modules in sequence according to the application flow received at step 201. Determining the output is described in greater detail below with respect to FIG. 3. Once output of a step is generated, whether a next step exists in the application flow sequence is performed at step 205. If a subsequent step in the sequence exists, steps 203-205 are repeated for subsequent steps until the application flow sequence is completed. Once the sequence is completed, the best performing configuration of software modules for the application flow is determined at step 205. Determining the best performing configuration may be performed by applying performance metrics (such as those described above with respect to step 107 of FIG. 1). Determining the best performing configuration may also include generating representative output for a step to be used as the input of a subsequent step in the application process. The representative output may be generated as described above with respect to step 109 of FIG. 1, for example. Once the best performing configuration is determined at step 205, the particular configuration, that is, the specific software modules used at each step in the application flow to derive the best performing output may be displayed to the user at step 207. The configuration may be displayed in a graphical user interface, for example. Disparities in performances with alternate configurations may also be displayed in the same or an additional display within the graphical user interface, according to various embodiments.

Figure 3:
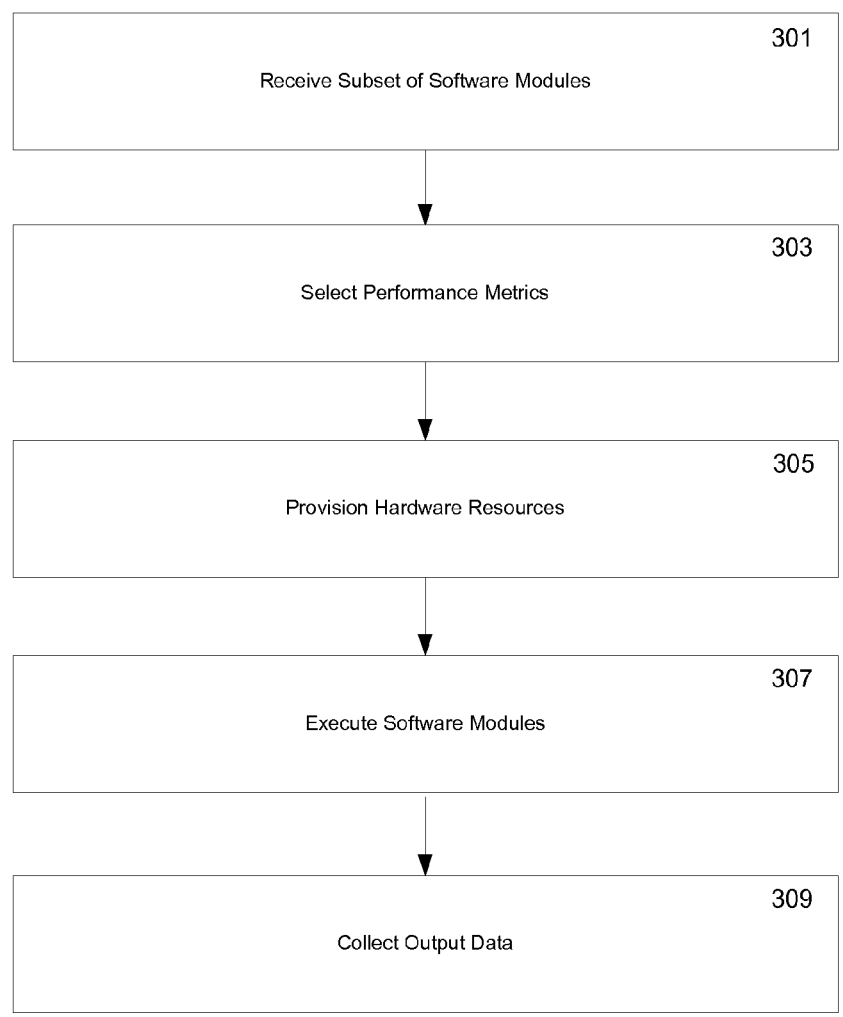
FIG. 3 is an illustration of an exemplary method for determining output for a step in an application flow, in accordance with various embodiments of the claimed subject matter.

FIG. 3 depicts a flowchart 300 of a process for determining output for a step in an application flow. The process presented in flowchart 300 may be performed, for example, during a step in a method of executing configurations of disparate software modules to determine a suitable solution, such as step 203 of flowchart 200. Steps 301-309 describe the steps comprising the process depicted in the flowchart 300 of FIG. 3 in accordance with the various embodiments herein described. In one embodiment, the flowchart 300 is implemented as computer-executable instructions stored in a non-transitory computer-readable medium.

At step 301, a subset of software modules to perform a step in an application flow is received. The subset of software modules may comprise, for example, all or a portion of the software modules being considered as candidates to perform the step. The subset may also comprise a single software module. At step 303, one or more performance metrics may be selected to be applied to the output of the subset of software modules received at step 301. The specific performance metrics to be applied may be selected by the user, or automatically generated. Once the subset of software modules is received at step 301 and the performance metrics are selected at step 303, hardware resources required to execute the software modules may be provisioned at step 305. The hardware resources may be provisioned by, for example, dynamically requisitioned computing resources from an infrastructure cloud.

At step 307, the software modules comprising the subset of software modules are executed in the computing resources provisioned at step 305. In one embodiment, each candidate software module of the subset of software modules may be executed in a separate and individual computing platform (e.g., a virtual server), so as to enable a parallel performance. Once the software modules are executed, the output of each software module candidate is collected at step 309. Once collected, the performance metrics selected at step 303 may be applied to determine a best performing output, and/or, a representative output for the subset of software modules for the particular step. Once the output is collected, the output can be used as an input to a next step in the application flow, or, alternatively, the optimal configuration of software module candidates may be determined.

Figure 4:
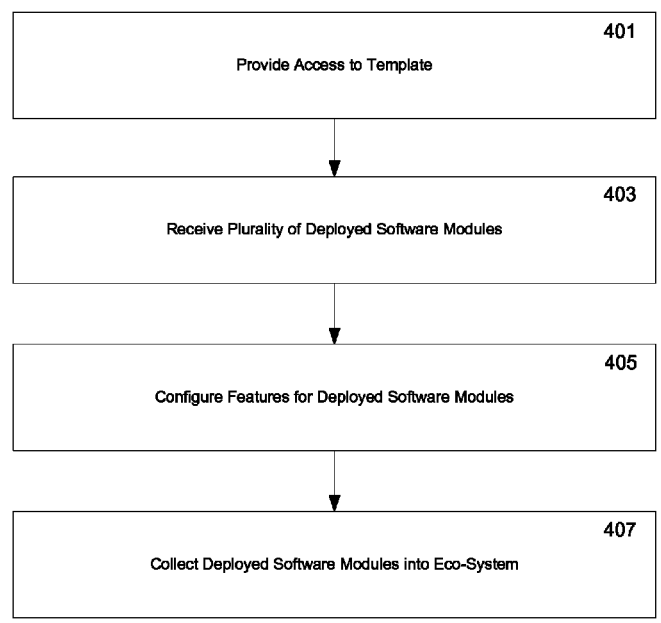
FIG. 4 is an illustration of an exemplary method of populating an eco-system with software modules, in accordance with various embodiments of the claimed subject matter.

To supply the eco-system with pre-configured software modules which a user can use to populate and perform an application flow, the software modules must first be submitted by their respective vendors, whereupon the software modules may be assimilated into the eco-system. FIG. 4 depicts a method for populating an eco-system with software modules.

As depicted, a standardized template of one or more virtual machine images is supplied to software module providers/vendors. Steps 401-407 describe the steps comprising the process depicted in the flowchart of FIG. 4 in accordance with the various embodiments herein described. In one embodiment, the flowchart 400 is implemented as computer-executable instructions stored in a non-transitory computer-readable medium.

At step 401, access to a module submission template is provided to a software vendor/provider. The template may, for example, be implemented as a platform upon which a software module may be executed, and may be configured with appropriate versions of operating systems, software libraries, and language specific emulators as needed. Providing access to the template (e.g., through a web portal) allows the software module providers to deploy their modules (step 403) without knowing specific details about or having compatibility issues with the underlying infrastructure. This standardized approach also has the benefit of reducing the complexity of performing any maintenance, upgrade of synced software, and/or integration with other modules.

Once deployed by a software provider and received in a software module template, the software module may be customized to include additional features (e.g., at step 405). For example, the software module may also be configured with any conventional industry and/or standardized security features, such as firewall settings, key management, user account management, etc. By employing such security features, this approach eases the maintenance, security installations, and upgrades. Furthermore, this approach also protects the module provider's intellectual property from being accessed by module-end users, thereby preventing malicious behavior such as unauthorized duplication of the module so that it is usable without licenses.

In addition, the software modules may also be configured with usage monitoring features. Such features may, for example, report the usage of the software module to other parts of the eco-system that are in charge of logging, billing, accounting, and auditing. In this way, the eco-system is able to mitigate or even entirely eliminate the significant initial capital investment required by software end-users while still providing a revenue generation model to the software module providers. Once configured, the software module may be collected at step 407 in an inventory of software modules. Subsequent users of the software eco-system may view the inventory and select from the inventory of software modules to perform an application flow. Using the above configured virtual machine images as building blocks, an eco-system can integrate these software modules to build various configurations for an end-to-end solution to a pre-defined task. These configurations can then be dynamically executed in parallel on virtual, requisitioned computing resources in a cloud computing infrastructure to compare their respective performances.

Figure 5:
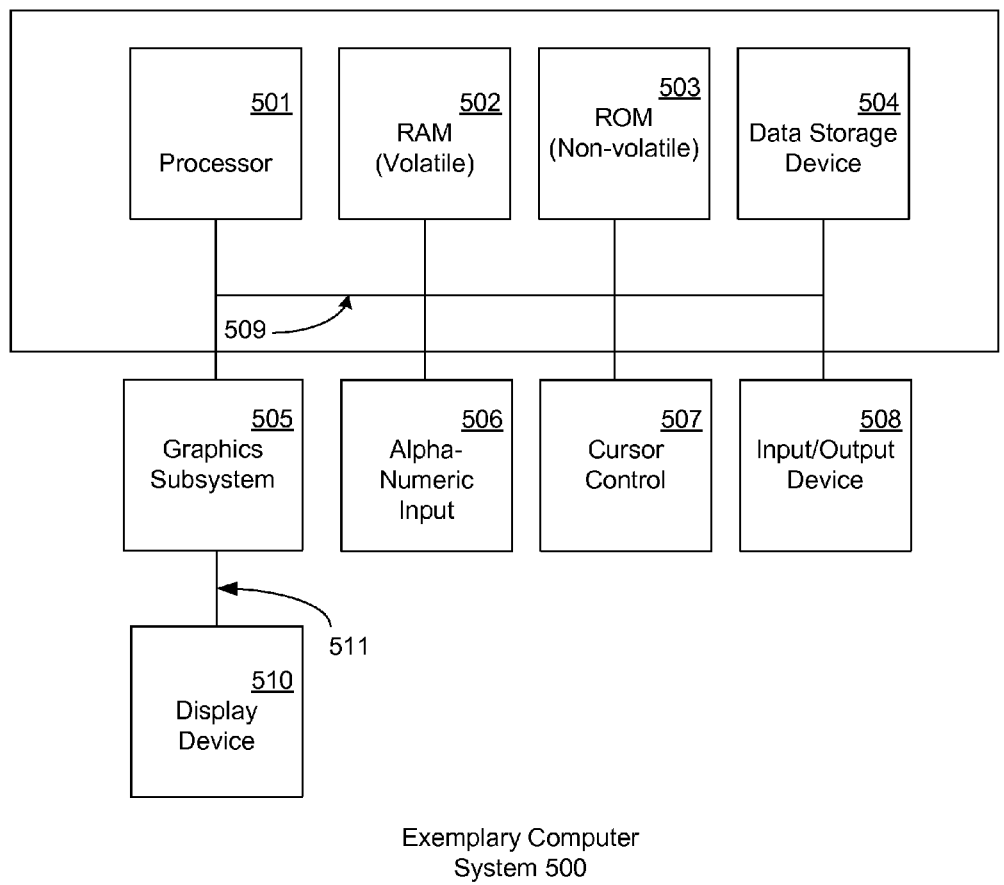
FIG. 5 is an illustration of an example computing system upon which embodiments of the present claimed subject matter may be executed.

As presented in FIG. 5, a system upon which embodiments of the present disclosure may be implemented includes a computing system environment, such as computing system 500. Computing system 500 may be used, for example, to instantiate a graphical user interface of a software eco-system. Alternatively, computing system 500 may also be used to host and execute software modules selected by a user to perform an application flow. In still further embodiments, computing system 500 may even be used to host a plurality of virtual computer platforms in a cloud infrastructure. In its most basic configuration, computing system 500 typically includes at least one processing unit 501 and memory, and an address/data bus 509 (or other interface) for communicating information. Depending on the exact configuration and type of computing system environment, memory may be volatile (such as RAM 502), non-volatile (such as ROM 503, flash memory, etc.) or some combination of the two.

Computer system 500 may also comprise an optional graphics subsystem 505 for presenting information to the computer user, e.g., by displaying information on an attached display device 510, connected by a video cable 511. According to embodiments of the present claimed disclosure, the graphics subsystem 505 may be coupled directly to the display device 510 through the video cable 511. A graphical user interface of a software module eco-system may be generated in the graphics subsystem 505, for example, and displayed to the user in the display device 510. In alternate embodiments, display device 510 may be integrated into the computing system (e.g., a laptop or netbook display panel) and will not require a video cable 511. In one embodiment, the process 500 may be performed, in whole or in part, by graphics subsystem 505 in conjunction with the processor 501 and memory 502, with any resulting output displayed in attached display device 510.

Additionally, computing system 500 may also have additional features/functionality. For example, computing system 500 may also include additional storage (removable and/or non-removable) including, but not limited to, magnetic or optical disks or tape. Such additional storage is illustrated in FIG. 5 by data storage device 507. Computer storage media includes volatile and nonvolatile, removable and non-removable media implemented in any method or technology for storage of information such as computer readable instructions, data structures, program modules or other data. RAM 502, ROM 503, and data storage device 507 are all examples of computer storage media.

Computer system 500 also comprises an optional alphanumeric input device 506, an optional cursor control or directing device 507, and one or more signal communication interfaces (input/output devices, e.g., a network interface card) 509. Optional alphanumeric input device 506 can communicate information and command selections to central processor 501. Optional cursor control or directing device 507 is coupled to bus 509 for communicating user input information and command selections to central processor 501. Signal communication interface (input/output device) 509, also coupled to bus 509, can be a serial port. Communication interface 509 may also include wireless communication mechanisms. Using communication interface 509, computer system 500 can be communicatively coupled to other computer systems over a communication network such as, for example, the Internet or an intranet (e.g., a local area network), or can receive data (e.g., a digital television signal).

By using any of the systems or methods provided above, a user is able identify a suitable configuration of software modules to perform a specific task. As described above, embodiments of the claimed subject matter provide the novel methods and eco-systems to determine optimal configurations of software modules by executing multiple software modules in parallel; automatically comparing their results, performance scores, and costs; and automatically producing a suitable and/or selected result.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method for generating a software configuration, comprising:
   receiving, by one or more processors, a plurality of software modules from one or more software module providers, the plurality of software modules being deployed upon a standardized template of virtual machine images and being configured with a plurality of features respectively selected by the one or more software providers;
   receiving, by the one or more processors, a first selection of a first software module from the plurality of software modules for performing a first step of an application flow;
   receiving, by the one or more processors, a second selection of a plurality of second software modules from the plurality of software modules for performing a second step of an application flow;
   executing, by the one or more processors, the first software module to perform the first step of the application flow and to generate a first output;
   providing, by the one or more processors, the first output as an input to each of the plurality of second software modules;
   executing, by the one or more processors and based on the first output, each of the plurality of second software modules in parallel and in separate, respective cloud computing environments to separately perform the second step of the application flow and to respectively generate a plurality of second outputs; and
   determining, by the one or more processors and based on the plurality of second outputs, an optimal software configuration comprising the first software module and a selected second software module of the plurality of second software modules for performing the application flow.

2. The computer-implemented method of claim 1, wherein one or both of the first and second selections are received from a user.

3. The computer-implemented method of claim 1, wherein one or both of the first and second selections are automatically received from software logic.

4. The computer-implemented method of claim 1, wherein the first software module and the plurality of second software modules are executed in a cloud computing infrastructure.

5. The computer-implemented method of claim 1, further comprising:
   applying one or more performance metrics to the plurality of second outputs to generate a representative output of the plurality of second software modules; and
   determining the selected second software module of the optimal software configuration as a module that corresponds to the representative output.

6. The computer-implemented method of claim 1, further comprising displaying the optimal software configuration in a graphical user interface.

7. The computer-implemented method of claim 1, wherein the plurality of features comprises a plurality of security features including one or more of a plurality of firewall settings, a plurality of key management settings, and a plurality of user account management settings.

8. The computer-implemented method of claim 1, wherein the plurality of features comprises a plurality of usage monitoring features including one or more of a user account activity logging feature, a billing feature, an accounting feature, and an auditing feature.

9. A non-transitory computer-readable storage medium coupled to one or more processors and having instructions stored thereon which, when executed by the one or more processors, cause the one or more processors to perform operations for generating a software configuration, the operations comprising:
- receiving a plurality of software modules from one or more software module providers, the plurality of software modules being deployed upon a standardized template of virtual machine images and being configured with a plurality of features respectively selected by the one or more software providers;
- receiving a first selection of a first software module from the plurality of software modules for performing a first step of an application flow;
- receiving a second selection of a plurality of second software modules from the plurality of software modules for performing a second step of an application flow;
- executing the first software module to perform the first step of the application flow and to generate a first output;
- providing the first output as an input to each of the plurality of second software modules;
- executing, based on the first output, each of the plurality of second software modules in parallel and in separate, respective cloud computing environments to separately perform the second step of the application flow and to respectively generate a plurality of second outputs; and
- determining, based on the plurality of second outputs, an optimal software configuration comprising the first software module and a selected second software module of the plurality of second software modules for performing the application flow.

10. The non-transitory computer-readable storage medium of claim 9, wherein one or both of the first and second selections are received from a user.

11. The non-transitory computer-readable storage medium of claim 9, wherein one or both of the first and second selections are automatically received from software logic.

12. The non-transitory computer-readable storage medium of claim 9, wherein the first software module and the plurality of second software modules are executed in a cloud computing infrastructure.

13. The non-transitory computer-readable storage medium of claim 9, wherein the operations further comprise:
- applying one or more performance metrics to the plurality of second outputs to generate a representative output of the plurality of second software modules; and
- determining the selected second software module of the optimal software configuration as a module that corresponds to the representative output.

14. The non-transitory computer-readable storage medium of claim 9, wherein the operations further comprise displaying the optimal software configuration in a graphical user interface.

15. The non-transitory computer-readable storage medium of claim 9, wherein the plurality of features comprises a plurality of security features including one or more of a plurality of firewall settings, a plurality of key management settings, and a plurality of user account management settings.

16. The non-transitory computer-readable storage medium of claim 9, wherein the plurality of features comprises a plurality of usage monitoring features including one or more of a user account activity logging feature, a billing feature, an accounting feature, and an auditing feature.

17. A system, comprising:
- one or more processors; and
- a computer-readable storage medium coupled to the one or more processors having instructions stored thereon which, when executed by the one or more processors, cause the one or more processors to perform operations for generating a software configuration, the operations comprising:
  - receiving a plurality of software modules from one or more software module providers, the plurality of software modules being deployed upon a standardized template of virtual machine images and being configured with a plurality of features respectively selected by the one or more software providers,
  - receiving a first selection of a first software module from the plurality of software modules for performing a first step of an application flow,
  - receiving a second selection of a plurality of second software modules from the plurality of software modules for performing a second step of an application flow,
  - executing the first software module to perform the first step of the application flow and to generate a first output,
  - providing the first output as an input to each of the plurality of second software modules;
  - executing, based on the first output, each of the plurality of second software modules in parallel and in separate, respective cloud computing environments to separately perform the second step of the application flow and to respectively generate a plurality of second outputs, and
  - determining, based on the plurality of second outputs, an optimal software configuration comprising the first software module and a selected second software module of the plurality of second software modules for performing the application flow.

18. The system of claim 17, wherein one or both of the first and second selections are received from a user.

19. The system of claim 17, wherein one or both of the first and second selections are automatically received from software logic.

20. The system of claim 17, wherein the first software module and the plurality of second software modules are executed in a cloud computing infrastructure.

21. The system of claim 17, wherein the operations further comprise:
- applying one or more performance metrics to the plurality of second outputs to generate a representative output of the plurality of second software modules, and
- determining the selected second software module of the optimal software configuration as a module that corresponds to the representative output.

22. The system of claim 17, wherein the operations further comprise displaying the optimal software configuration in a graphical user interface.

23. The system of claim 17, wherein the plurality of features comprises a plurality of security features including one or more of a plurality of firewall settings, a plurality of key management settings, and a plurality of user account management settings.

24. The system of claim 17, wherein the plurality of features comprises a plurality of usage monitoring features including one or more of a user account activity logging feature, a billing feature, an accounting feature, and an auditing feature.

* * * * *